US007519608B2

(12) United States Patent
Foster (10) Patent No.: US 7,519,608 B2
(45) Date of Patent: Apr. 14, 2009

(54) SECURE VIRTUAL DATA WAREHOUSING SYSTEM AND METHOD

(75) Inventor: Randall J. Foster, Reston, VA (US)

(73) Assignee: SLICCWARE, Reston, VA (US)

(*) Notice: Subject to any disclaimer, the term of this patent is extended or adjusted under 35 U.S.C. 154(b) by 249 days.

(21) Appl. No.: 11/085,553

(22) Filed: Mar. 22, 2005

(65) Prior Publication Data

US 2005/0210049 A1   Sep. 22, 2005

Related U.S. Application Data

(60) Provisional application No. 60/554,935, filed on Mar. 22, 2004.

(51) Int. Cl.
*G06F 17/30* (2006.01)
(52) U.S. Cl. .............................. 707/101; 707/3; 707/5; 707/100
(58) Field of Classification Search ......... 707/100–102, 707/104.1, 1–3
See application file for complete search history.

(56) References Cited

U.S. PATENT DOCUMENTS

| | | | | |
|---|---|---|---|---|
| 5,603,025 A | * | 2/1997 | Tabb et al. | 707/2 |
| 5,615,367 A | * | 3/1997 | Bennett et al. | 707/102 |
| 5,787,416 A | * | 7/1998 | Tabb et al. | 707/2 |
| 6,185,560 B1 | * | 2/2001 | Young et al. | 707/6 |
| 6,449,627 B1 | * | 9/2002 | Baer et al. | 715/514 |
| 6,587,857 B1 | | 7/2003 | Carothers et al. | |
| 6,671,689 B2 | | 12/2003 | Papierniak | |
| 6,760,719 B1 | | 7/2004 | Hanson et al. | |
| 6,795,825 B2 | * | 9/2004 | Rishe | 707/10 |
| 6,842,758 B1 | * | 1/2005 | Bogrett | 707/103 R |
| 6,980,987 B2 | * | 12/2005 | Kaminer | 707/6 |
| 2002/0133504 A1 | * | 9/2002 | Vlahos et al. | 707/104.1 |
| 2003/0120560 A1 | * | 6/2003 | Almeida | 705/27 |
| 2004/0023057 A1 | | 2/2004 | Kamijima | |
| 2005/0006594 A1 | | 1/2005 | Calderoni et al. | |
| 2005/0010227 A1 | | 1/2005 | Paul | |
| 2006/0010126 A1 | * | 1/2006 | Anick et al. | 707/4 |

* cited by examiner

*Primary Examiner*—Don Wong
*Assistant Examiner*—Hanh B Thai
(74) *Attorney, Agent, or Firm*—Dickstein Shapiro LLP (57) ABSTRACT

The invention advances the technology of virtual data warehousing: by allowing data to be organized in any of a number of virtual structures without the need for replication; by allowing the data to be accessed through the virtual structure at speeds in excess of those for conventional methods; by allowing data to be searched at significantly higher speeds, using a new indexing technology that enables tables to be indexed by data external to themselves, thus removing the need for complex joins; and by providing a workable security model for compartmenting access to both the data and the indices used to support searching.

30 Claims, 12 Drawing Sheets

Figure 1
Process 100

OVERVIEW OF A TOTALLY VIRTUALIZED SYSTEM

(101) Virtual tables are created mapping actual tables within the member databases

(102) Data mapped by the virtual tables is indexed, in a conventional manner, using data that is only extracted temporarily for indexing.

(103) Virtual tables are linked via hyper-keys, which connect records from one table to records from another, to form structures that facilitate searching and retrieval of the data within the member databases.

(104) Conventional indexes attached to virtual tables lower down within the hierarchical structure are used to create and maintain hyper-indexes attached to the highest level of the hierarchy.

(105) The structure is searched using the hyper-indexes, thus avoiding the need for expensive table joins.

(106) In response to a request, data is retrieved by following the hyper-keys to the virtual tables providing access to the databases containing the desired data, where queries by record id are performed.

Figure 2
Process 200
REGISTERING A TABLE AND THE ASSOCIATED PRIMARY HYPER-KEY

Figure 3
Process 300 — REGISTERING A SECONDARY HYPER-KEY (301) Create a unique name by combining the table name with the field name for the secondary hyper-key.

(302) Find the name within the external name lookup structure or insert it into the external name lookup structure and identify the external type as a secondary hyper-key (303) Retrieve external id.

— name already exists in lookup structure
— name being added to lookup structure ? key create
(304a) Return an error code.

key access (304b) Create a hyper-key lookup structure pointed to by this secondary hyper-key id for storing and dereferencing secondary hyper-key values to secondary hyper-ids.

EXTERNAL ID (305) Create a list array structure pointed to by this secondary hyper-key id for storing lists of record ids associated with individual secondary hyper-ids.

EXTERNAL ID (306) Add the table id to the location within the global parent table array structure pointed to by the secondary hyper-key id.

EXTERNAL ID          TABLE ID (307) Return the external id as the secondary hyper-key id.

Figure 4 Process 400 — REGISTERING A HYPER-KEY LINK

Figure 5
Process 500 — REGISTERING A CONVENTIONAL INDEX

501 Create a unique name by combining the table name with the field name for the index.

502 Find the name within the external name lookup structure or insert it into the external name lookup structure and identify the external type as a conventional index.

503 Retrieve external id.

name already exists in lookup structure

504a Return an error code.

name being added to lookup structure

504b Add to the location within the global index descriptor array pointed to by the external id, the necessary descriptor information, so that the portions of the index relating to a given record id can be extracted and placed into a hyper index.

505 Add the index type: keyword, range, timeline, grid, etc., to the location within the global index type array pointed to by the external id for the index.

506 Add the table id to the location within the global parent table array structure pointed to by the external id for the index.

507 Return the external id as the index id.

Figure 6

Process 600

BUILDING A HYPER-INDEX DESCRIPTOR

601) Locate the conventional index upon which the hyper index is based, and add the external id to the descriptor for the hyper index. -- See figure 7-A.

602) Convert the list of hyper-key table and field names to a list of hyper-key link ids, the hyper-key link path, and add it to the descriptor for the hyper-index. — See figure 7-B.

603) Add the access mask for the table using the hyper-index, the access mask for the conventional index, and the access mask attached to each link in the hyper-key link path to the descriptor for the hyper-index.

604) Return the completed hyper-index descriptor.

Figure 7-A
Process 700

RETRIEVING AN EXTERNAL ID

This function is used to retrieve:

(1) the index id for a conventional index;
(2) the index id for a hyper- index;
(3) the table id for a virtual table;
(4) the hyper-key id for a primary hyper-key;
(5) the hyper-key id for a secondary hyper-key;

(701) Create a unique name by combining the table name with the field or index name.
Use a null string for a primary index or a virtual table.

(702) Find the name within the external name lookup structure or insert it into
the external name lookup structure and identify the type of the external.

(703) Retrieve external id.

found
(704a) Return the external id.

not found
(704b) Return an error code.

Figure 7-B  CREATE HYPER-KEY LINK PATH
Process 750

Figure 10-A — FILL UPDATE REQUEST TREE
Process 1000

Figure 10-B — Process 1050 — UPDATING HYPER-INDEX DATA SECTIONS

SECURE VIRTUAL DATA WAREHOUSING SYSTEM AND METHOD

CROSS-REFERENCE TO RELATED APPLICATIONS

This application claims the benefit of U.S. Provisional Application No. 60/554,935, entitled SECURE VIRTUAL DATA WAREHOUSING, filed Mar. 22, 2004, the entire disclosure of which is incorporated herein by reference.

FIELD OF THE INVENTION

The invention relates generally to data processing methods and systems. Specifically, the invention relates to efficient and secure retrieval of data stored at a number of remote sites via a virtual data warehouse.

BACKGROUND OF THE INVENTION

Dealing with data distributed over multiple databases has long been a problem. As accessing the data from multiple databases has become more of a necessity, people have increasingly turned to data warehousing. Data warehousing provides a method in which the data from various databases could be replicated in a manner that allowed for the data to be treated as belonging to a single database. Further, if one had the resources, the new replicated structure was not required to be a relational database, but instead could be implemented as any kind of structure desired.

Data warehousing provided for a simpler and faster method for extracting results. As new data warehouse techniques and software became available, warehouses were designed in a manner that best fit the type of data requests that were expected. By abandoning the constraints of the relational database, far more efficient designs could be implemented. However, data warehousing is a very costly endeavor, and each reorganization of the data required complete replication—putting limits on how flexible the data warehouse could be. Unfortunately, for many potential users, the cost of maintaining something the size of a data warehouse was prohibitive. Data warehouses were, and still are, a major undertaking.

In recent years a new technology, Virtual Data Warehousing, has attempted to allow multiple databases to be interrogated together without the need of constructing and maintaining a massive data warehouse. Instead of replicating all the databases within a single massive database, a virtual data warehouse provides a common access to all the databases, making the collection of independent databases appear as a data warehouse to the user. This greatly reduces infrastructure and maintenance costs; and the data does not have to be replicated. But, virtual data warehousing suffers from terribly poor response times, and major drains on the overall system that cannot be adequately anticipated due to unscheduled massive processing within the member databases.

An additional problem that has arisen involves dealing with many users attempting to access data from many sources. In this scenario there is a problem properly restricting access to certain data while granting access to other data. Conventional data warehouses require very specific software to be written to address this problem. Out of the box, however, there is no simple solution. Conventional virtual data warehouses rely on the security models of the member databases. But, these models break down as soon as any performance upgrades such as caching or indexing of data is done external to the member databases.

BRIEF SUMMARY OF THE INVENTION

The present invention overcomes the above-noted deficiencies by building upon current technologies for retrieving data from various sources, including conventional automated database login and retrieval, and remote and local document retrieval. Additionally, the invention builds upon current indexing technology, and is intended to be able to be integrated with any form of data base access, and proprietary or open source indexing methods by a team of appropriate experts.

The present invention greatly extends the capabilities of a conventional virtual data warehouse. The invention allows the user to benefit from the savings and simplified maintenance of a virtual data warehouse, while at the same time, experiencing the major performance gains, security, and simplicity of access that generally only accompany a very well designed and costly data warehouse. The invention makes use of hyper-indices—indices that are derived from data external to the tables they are attached to, hyper-keys—a means of directly linking records across tables without the use of run-time lookups, and virtual tables, a conventional means of mapping and accessing data from database tables or other sources such as file systems without the need for replication.

The invention allows the data held within the member databases to be organized, using virtual tables and hyper-keys, in any fashion that best supports user requests without permanently replicating that data. Multiple structures could be maintained within the same Secure Virtual Data Warehouse. Everything from spreadsheet style organization to complex hierarchical structures could be maintained, with the same data being reused over and over again. And no data replication need occur. If a given structure is no loner needed, it is destroyed. The data remains in tact within the member databases. If a new structure is needed, it is created.

In addition, hyper-indices allow records mapped to one virtual table to be index by data accessed through a different virtual table, provided that the second virtual table has been linked to the first by hyper-keys—either directly or indirectly. In other words, if an index were placed on the age field in a table called "Personal Information", and that table was linked to a table called "Executives", which was linked to a table called "Companies"; a hyper-index could be created, which would allow the table "Companies" to be searched for businesses having executives under the age of 35 directly. The names and ages of those individuals could also be retrieved via the hyper-keys just as if the data belonged to the selected records in the "Companies" table. Large, complex searches, which would normally require expensive joins and take large amounts of resources and time, are reduced by this invention to simple searches combining multiple indices on the same virtual table, which finish quickly.

The unscheduled massive processing within the member databases of a conventional virtual data warehouse is replaced by a simple extraction of the final results. And even that can be as simple as extracting fields of data from records selected by record ID—the least impact possible.

Finally, the problem of securing access to the individual data sources is accomplished by attaching a bit map of user groups, which are authorized to have access, to each virtual table. Each virtual table is, in turn, mapped to a data source sharing the same access restrictions. Access to data via a path of hyper-keys is restricted by each of the tables containing a hyper-key from the path. Access to a conventional index is restricted by the virtual table it is applied to. Access to a hyper-index is restricted by the virtual table it is applied to, the virtual table from which the data was indexed, and each table containing a hyper-key in the path between the two virtual tables.

BRIEF DESCRIPTION OF THE DRAWINGS

FIGS. 10-A and 10-B are respectively flow chart diagrams for filling an update request tree and for updating the individual hyper-index data sections.

DETAILED DESCRIPTION OF THE INVENTION

Overview. This invention is further evolves the virtual data warehouse. A virtual data warehouse can be thought of as a collection of virtual tables. Each virtual table is representative of a table within an actual database, and may actually contain records which correspond to records within the actual table, and may even contain some cached fields. Accessing the virtual table generally causes the system to access the actual table within the database. More efficient virtual data warehouses may actually, cache and even index some of the data from the member databases. This invention takes this caching and indexing in a different direction allowing virtual data warehouses to achieve a whole new level of flexibility, efficiency, and security.

This invention allows the data from the member databases to be reorganized in any number of ways by simply linking virtual tables together. Virtual tables are linked together via hyper-keys, which individually link one or more records within a virtual table to one or more records within a different virtual table. Hyper-keys are similar to keys within a conventional database, but have some important differences. A hyper-key can best be thought of as a direct link from a record in one virtual table to one or more records in another table. Hyper-keys, are of two types: foreign hyper-keys which are used to access records from a different virtual table; and local hyper-keys which are exported to allow other virtual tables to access records from the virtual table they reside in. Further, two types of local hyper-keys exist: primary hyper-keys, which have a one-to-one correlation of values to records and can be used to identify a single record; and secondary hyper-keys, which can have a one-to-many correlation of values to records. Exactly one primary hyper-key is assigned to each virtual table. For that reason, a primary hyper-key can always be used to locate an individual record. Finally, a field containing a foreign hyper-key can be exported as a link to allow a way for one virtual table to link through a second virtual table to a third virtual table, and so on.

Unlike conventional database keys, which can be used to access records from any number of tables, each foreign hyper-key must be identified with a very specific virtual table and the field where the matching hyper-key exists. This allows the hyper-keys to be resolved as soon as data is entered into the system, and to be replaced by hyper-IDs within the data. A hyper-ID, which is either a record ID (in the case of a primary hyper-key) or a virtual link to a list of record IDs (in the case of a secondary hyper-key) provides for very fast processing of any indirection. For simplicity, we will refer to the hyper-ID associated with the primary hyper-key as the record ID. There is no reason why conventional database keys and hyper-keys cannot exist within the same Secure Virtual Data Warehouse. In order to extend the capabilities of hyper-keys and allow for a truly hierarchical structure, the invention uses special virtual tables that have no corresponding actual tables, but only contain hyper-keys. These special virtual tables can be used as nodes within the desired structure. By combining these special virtual tables with virtual tables that actually map data, various desirable data structures can be obtained.

To provide for a more efficient means of access while still keeping the original data normalized and within the original data structures, the invention provides a new structure, the hyper-index. A hyper-index allows for data from one virtual table to be indexed by data from a different virtual table. A hyper-index, once built, is used just as any other index. The difference between a hyper-index and a conventional index is the location of the data being indexed, and in the maintenance of the hyper-index. An index is created to provide fast access to individual records through a specific virtual table. With a conventional index, the data used to create that index is data from the records retrieved through the virtual table for which the index is being created. With a hyper-index, the data is retrieved through a different virtual table whose have been linked by hyper-keys to the records of the virtual table where the index is being applied. In order for records in one virtual table to be indexed by data from another virtual table, there must be a direct path of hyper-keys from the virtual table to be indexed to the virtual table supplying the data for the index.

Restricting access to data within a virtual data warehouse using hyper-indexing is carried out in a very simple way. Each virtual table has attached to it an Access Mask—a bit map of user groups that have access to the table. Each request for data has attached to it a Group Mask—a bit map of user groups the requestor belongs to. For the requestor to be granted access, at least one bit that is set active in the Access Mask must also be set active in the Group Mask. This is true for each virtual table. Accordingly, if an individual had access to a virtual table containing a foreign hyper-key, but did not have access to the virtual table the foreign hyper-key pointed to, he would only retrieve results from the first virtual table. Any request to retrieve results through the foreign hyper-key would be denied.

A conventional index applied to data accessed through a virtual table inherits its access restrictions from that virtual table. A hyper-index inherits its access restrictions from the virtual table it is applied against, the virtual table providing the data for the conventional index it is using as a basis, and each of the virtual tables providing the links between those two tables. For an individual to be able to search a hyper-index, he must have access privileges to each of those tables.

Incorporating data updates into the system is a two-pass process. In the first pass, records within the virtual tables are inserted, updated, or deleted; and conventional indices are adjusted accordingly. In the second pass, hyper-indices are adjusted to reflect the changes made in the first pass.

Figure 1:
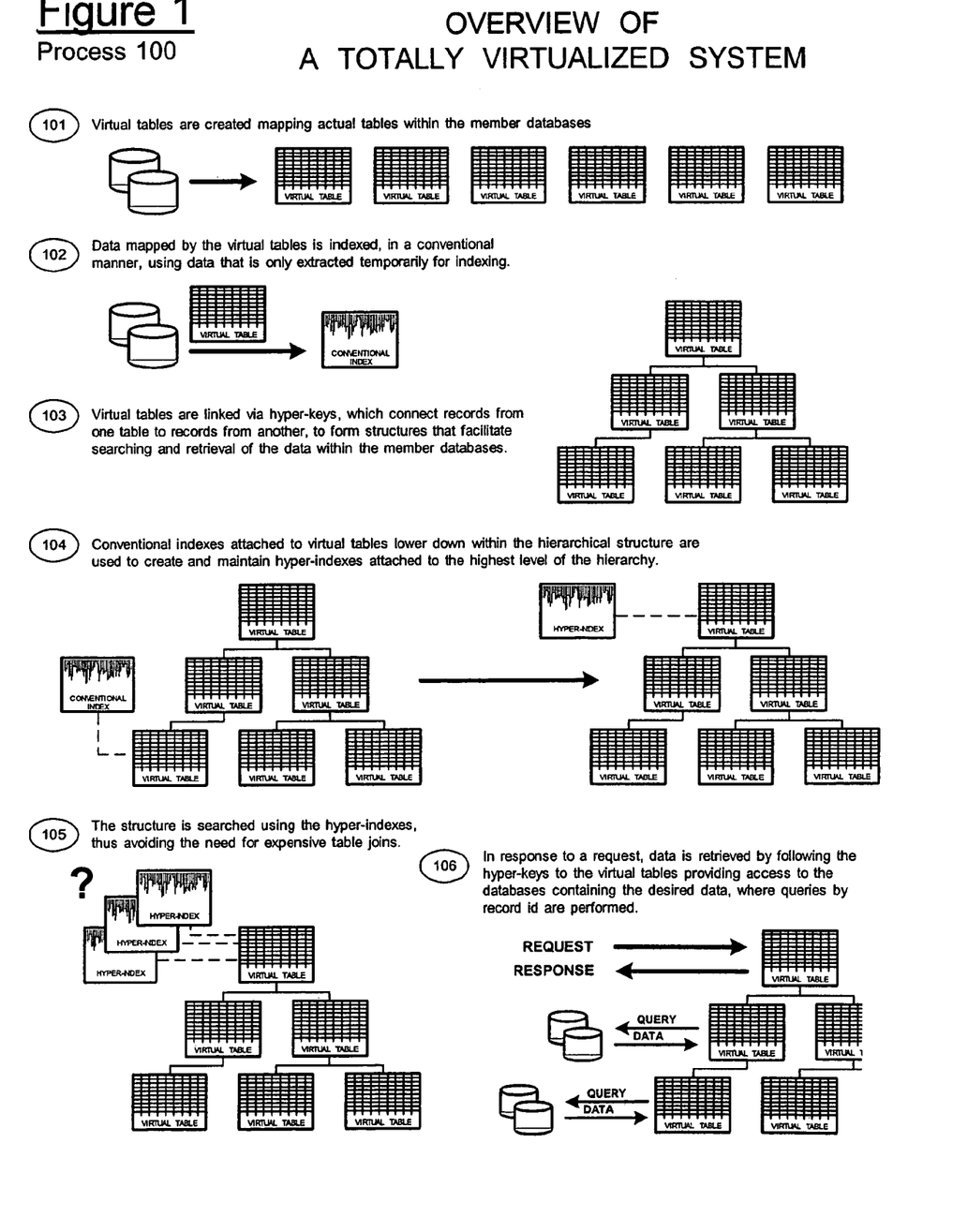
FIG. 1 is an overview flow chart of the virtualized system forming the present invention.

Referring to FIG. 1, an overview 100 of the totally virtualized system is shown. Specifically this figure shows an overview of a totally virtualized system, in which no data is stored outside the member databases. Steps 101 through 104 show the major steps in preparing the system for access. In step 101 virtual tables are created mapping actual tables within the member databases. At step 102 data mapped by the virtual tables is indexed ( in any conventionally known manner) using data that is only extracted temporarily for indexing. At step 103 virtual tables are linked via hyper-keys which act to connect records from one table to records from another in order to form structures that facilitate searching and retrieval of the data within the member databases. At step 104 conventional indexes are attached to virtual tables that are lower down within the hierarchical structure and are used to create and maintain hyper-indexes attached to the highest level of the hierarchy.

Steps 105 and 106 are the major steps involved in retrieving data. At step 105 the structure is searched using the hyper-indexes thus avoiding the need for expensive table joins. At step 106 in response to a request, data is retrieved by following the hyper-keys to the virtual tables providing access to the databases containing the desired data, where queries by record ID are performed. The strict hierarchical structure is simply a representation of one of many possible structures that could be employed within the system. Also, certain data could also be held outside the member databases, if desired, to facilitate fine tuning the search request before accessing the member databases.

Creating a Virtual Table. At the time the virtual table is created, each field is assigned a field id, and a special field, the identity field, is set aside for the identity value used to identify each record uniquely during update. Each table, and the associated primary hyper-key must be registered. (See FIG. 2.) The table name will be used as the lookup name to search the global external name lookup structure. This same table name will also serve as the primary hyper-key name for the table.

Figure 2:
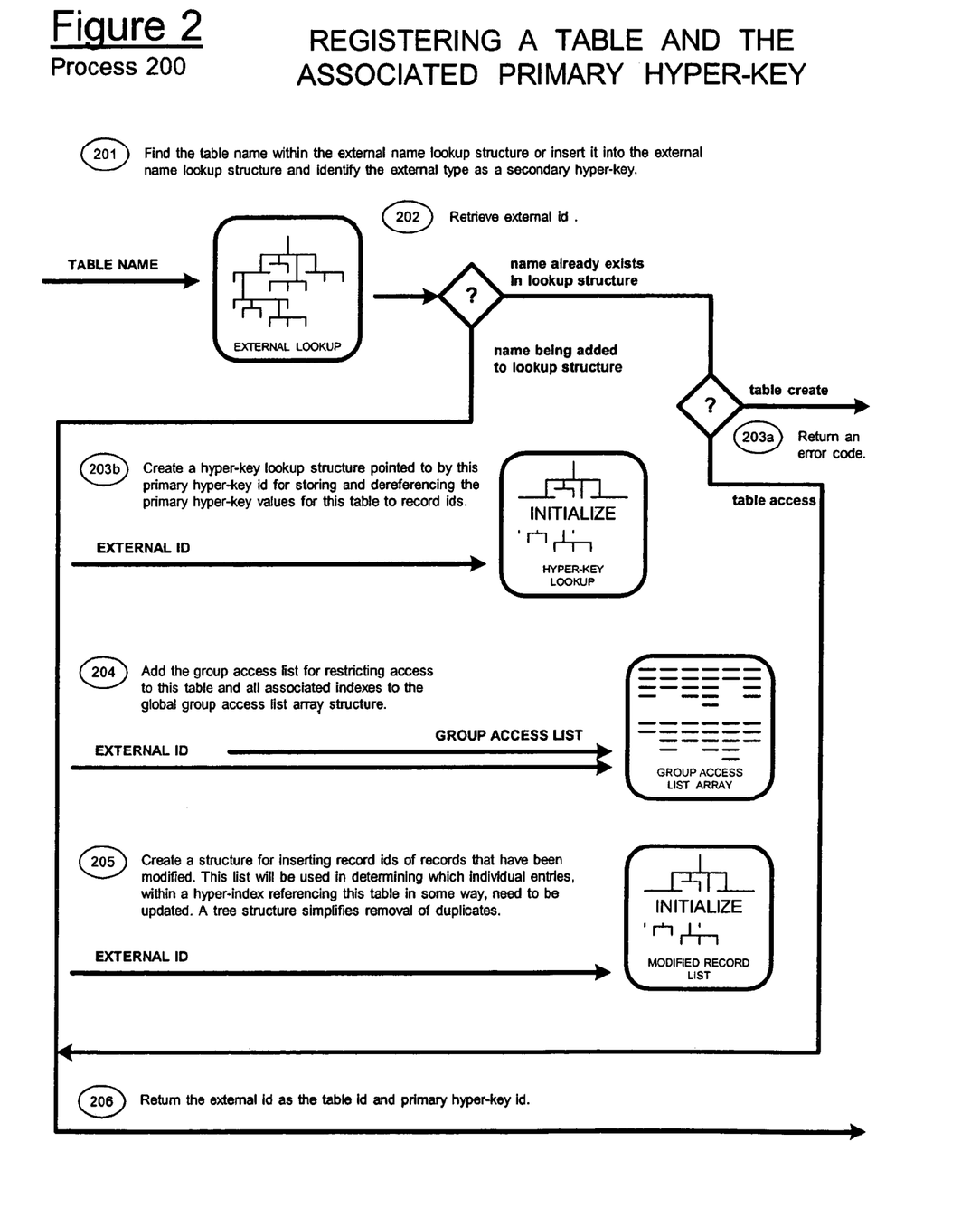
FIG. 2 is a flow chart that depicts the steps involved in registering a table and the associated primary hyper-key.

As part of the registration process an external id is found, or generated and stored, within the global external name lookup structure under the lookup name. If the external id was not found but needed to be generated, the following actions are performed: (1) A hyper-key lookup structure, pointed to by the generated external id (step 203*b*), is created. That structure will be used to resolve hyper-key values for the primary hyper-key into the appropriate record ids. (2) The group access list to be associated with this table is added to the global group access list array structure Step 204. (3) The Modified Records List Structure is created, which will be used to identify modified records so that hyper-indices may be updated accordingly Step 205.

The external id, generated by the registration process and returned to the calling module, will be used as both, the table id and the primary hyper-key id step 206. As the table id, it will be used in any future access of the table and any structures, either local to the table or external lookup structures, containing information relevant to the table. Upon return from the lookup, the table id is stored along with the other table information. As the primary hyper-key id, it will be used to facilitate rapid location of the proper lookup structure for dereferencing the primary hyper-key for any record within this table, and returning a record id. The identity value for each record will be used as the primary hyper-key.

Referring now to FIG. 2, this Figure shows the steps 200 involved in registering a table and the associated primary hyper-key. This process needs to be available to both the table creation and registering process and the foreign hyper-key creation and registering process to avoid requiring a specific order of table creation, and possibly a dead-lock. Steps 201 and 202 are carried out as follows. Step 201 involves finding a table name within the external name lookup structure or inserting it into the external name lookup structure and identifying the external type as a secondary hyper-key. Step 202 then retrieves the external key. If during step 201, the name is found within the lookup structure and this is a table create request, an error is returned at step 203*a*. If during step 201, the name is found within the lookup structure and this is not a table create request, the external id retrieved in step 202 is returned as both the table id and the primary hyper-key id. If during step 201, the name is not found within the lookup structure, steps 203*b*, 204 and 205 are carried out and the external id retrieved in step 202 is returned as both the table id and the primary hyper-key id.

Registering a Secondary Hyper-Key. Each secondary hyper-key must be registered. (See FIG. 3.) The secondary hyper-key is registered using the table name, table id, and field name for the location where the secondary hyper-key resides. The table name and field name are mangled to produce a unique name. This unique name will be used as the lookup name to search the global external name lookup structure.

Figure 3:
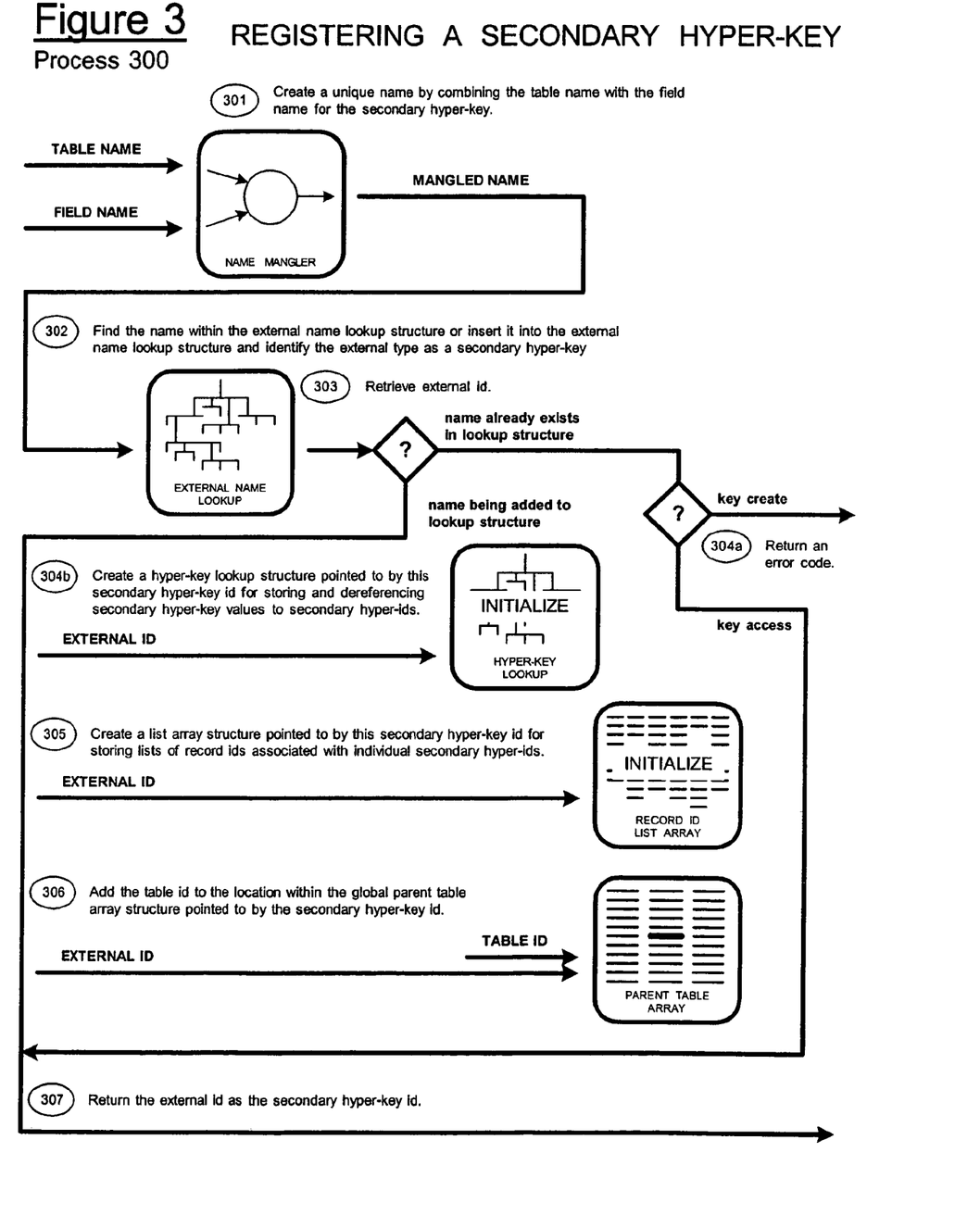
FIG. 3 is a flow chart that depicts the steps involved in registering a secondary hyper-key.

As part of the registration process an external id is found, or generated and stored, within the global external name lookup structure under the lookup name. If the external id was not found but needed to be generated, the following actions are performed: (1) A hyper-key lookup structure, pointed to by the generated external id, is created. That structure will be used to resolve hyper-key values for the secondary hyper-key into the appropriate hyper-ids. (2) A list array structure that may be accessed using the hyper-ids returned by the newly created A hyper-key lookup structure is created. That structure will be used to hold lists of record ids for records that are supposed to be accessed by the secondary hyper-key associated with the hyper-id pointing to the list. (3) The table id is added to the global parent table array structure, which is used to identify the parent tables for all registered externals, at the location determined by the external id. Finally, the external id is returned so that it may be associated with the field within the table structure.

Specifically FIG. 3 shows the steps involved in registering a secondary hyper-key 300. This process needs to be available to both the secondary hyper-key creation and registering process and the foreign hyper-key creation and registering process to avoid requiring a specific order of table creation, and possibly a dead-lock. Steps 301, 302 and 303 are carried out as shown. If during step 302, the name is found within the lookup structure and this is a key create request, an error is returned at step 304*a*. If during step 302, the name is found within the lookup structure and this is not a key create request, the external id retrieved in step 303 is returned as the secondary hyper-key id. If during step 302, the name is not found within the lookup structure, steps 304*b*, 305, and 306 are carried out and the external id retrieved in step 303 is returned as the secondary hyper-key id.

Registering a Foreign Hyper-Key. Each foreign hyper-key field must also be registered in the same way as the hyper-key it is intended to access. If it is intended to access a primary hyper-key, it must register the name of the table it is intended to access. The registration proceeds just as with registering the table. (See FIG. 2.) If it is intended to access a secondary hyper-key, it must register the name of the secondary hyper-key field along with the name of the table it is intended to access. The registration proceeds just as with registering the secondary hyper-key. (See FIG. 3.)

Registering a Hyper-Key Link. Finally, foreign hyper-keys within a virtual table, which are to be used as hyper-key links must be registered as such as shown by process steps 400. (See FIG. 4.) The hyper-key link is registered using the table name, table id, field name, and field id for the location where the foreign hyper-key resides, and the target hyper-id that was returned when the foreign key field was registered. The table name and index name are mangled to produce a unique name. This unique name will be used as the lookup name to search the global external name lookup structure.

Figure 4:
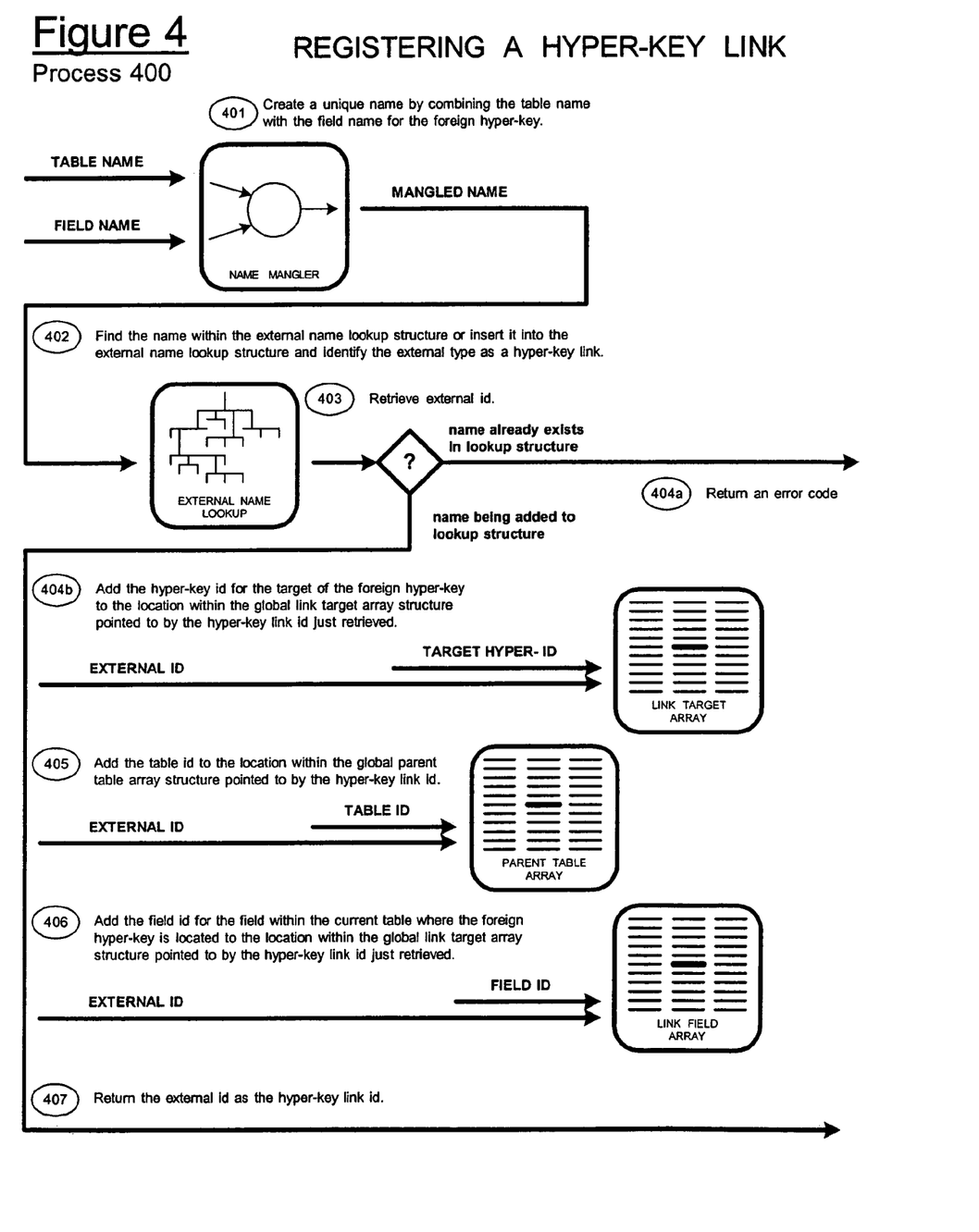
FIG. 4 is a flow chart showing the steps involved in registering a hyper-key link.

As part of the registration process an external id is found or generated and stored within the global external name lookup structure under the lookup name. If the external id was not found but needed to be generated, the following actions are performed: (1) The target hyper-id is added to the global link target array structure (step 404*b*), at the location determined by the external id. (2) The table id is added to the global parent table array structure step 405, which is used to identify the table exporting the link information, at the location determined by the external id. (3) The field id is added to the global link field array structure step 406, which is used to identify the field exporting the link information, at the location determined by the external id. Finally, the external id is returned Step 407 so that it may be associated with the index as the index id.

Registering a Conventional Index. Any conventional index that is to be used as part of a hyper-index must be registered. A conventional index is one that is created on a virtual table using data within that table, which may have been extracted from the data source being mapped by that virtual table. The data may be maintained permanently within that virtual table, or only exist for the period of time during which it is being accessed.

Figure 5:
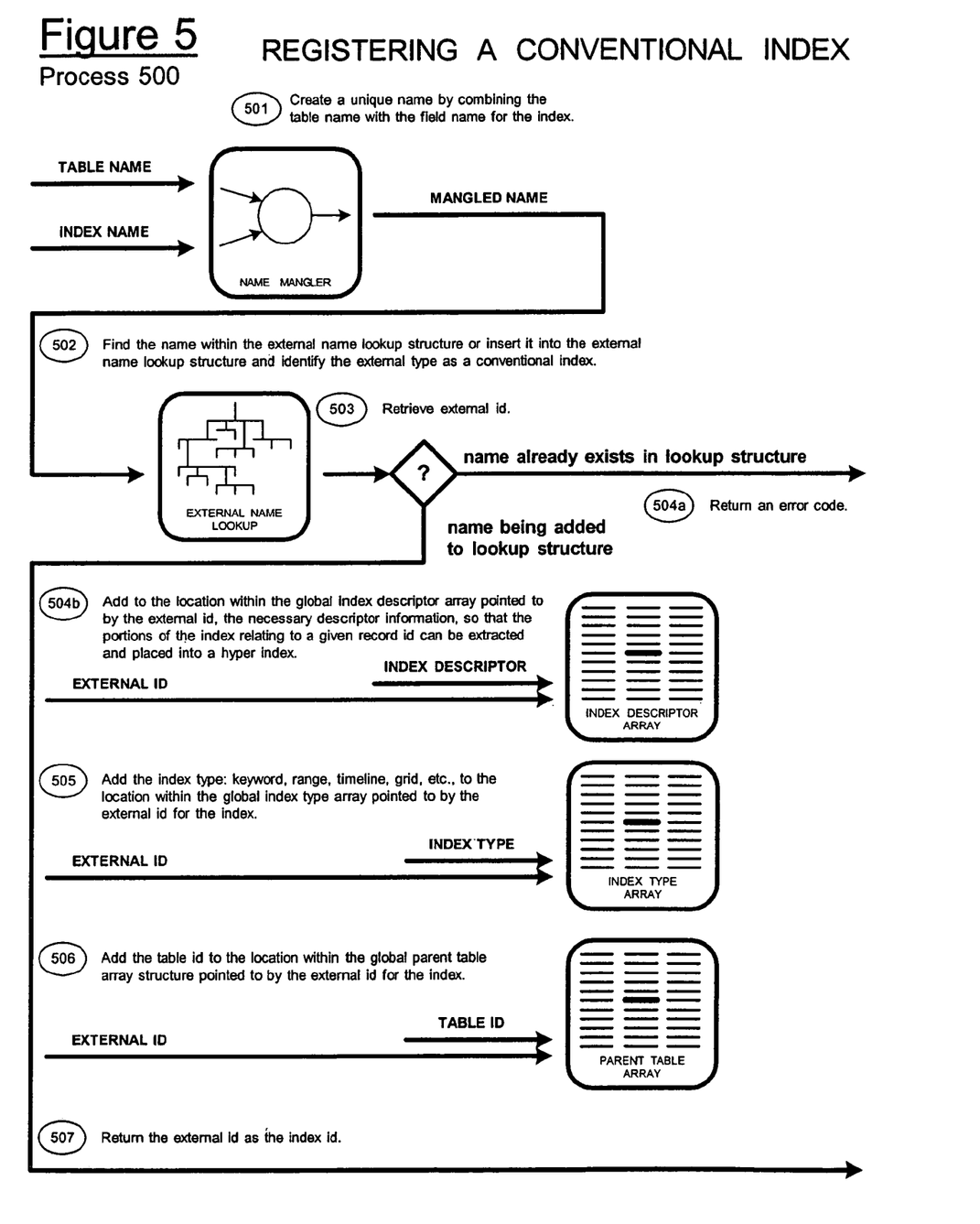
FIG. 5 is a flow chart illustrating the steps involved in registering a conventional index so that it may be used by the system to create one or more hyper indexes.

Referring now to FIG. 5, the conventional index is registered as shown by process steps 500 using the table name, table id for the table that the index is attached to, and the index name, index type, and index descriptor. The descriptor contains all the information necessary for allowing portions of the index, based upon the record id, to be extracted and placed into another index—a hyper-index. Both, the descriptor information, and the process of moving indexing structures and data between indexes are unique to the individual indexing algorithms as is conventionally known in the art. The table name and index name are mangled at step 510 to produce a unique name. This unique name will be used as the lookup name to search the global external name lookup structure.

As part of the registration process an external id is found at step 502, or generated and stored, within the global external name lookup structure under the lookup name. If the external id was not found but needed to be generated as shown at step 503, the following actions are performed: (1) The descriptor information for the conventional index is added to the global index descriptor array structure at step 504*b*, at the location determined by the hyper-id, so that one or more hyper-indexes may be created using information from the conventional index. (2) The type of the index: keyword, range, timeline, grid, etc., is added to the global index type array structure, at the location determined by the hyper-id at step 505. (3) At step 506, the table id is added to the global parent table array structure, which is used to identify the parent tables for all registered externals, at the location determined by the external id. Finally, the external id is returned at step 507 so that it may be associated with the index as the index id.

Figure 6:
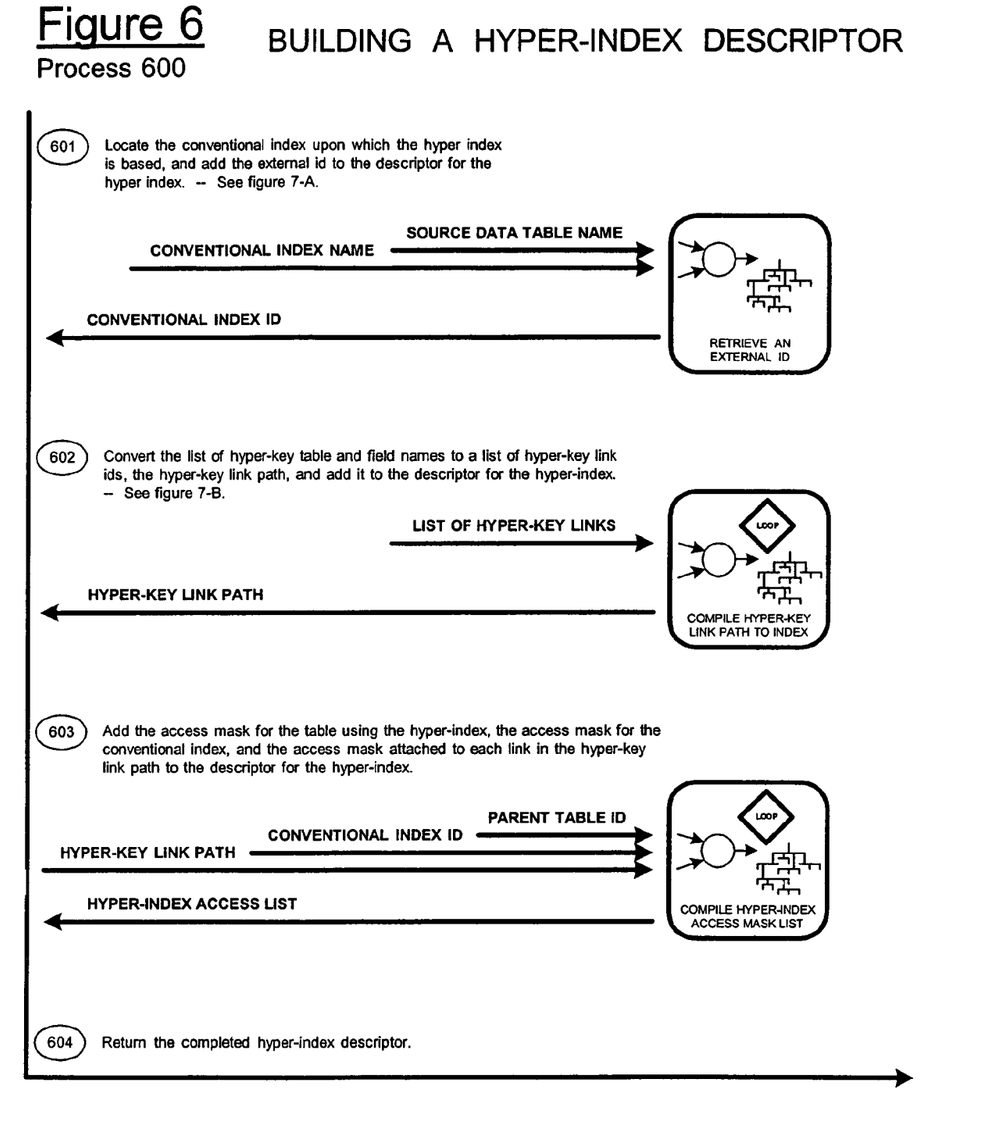
FIG. 6. is a flow chart illustrating the steps involved in building a hyper-index descriptor.

Creating a Hyper-Index. Referring to FIG. 6, at the time a hyper-index is created, all components to be used in the hyper-index must already exist. The virtual table upon which the hyper-index is to be applied must have a foreign hyper-key that points either directly or indirectly to the virtual table attached to the conventional index. That is the foreign hyper-key must be a primary or secondary hyper-key from the virtual table attached to the conventional index, or it must point to the first hyper-key link in a chain of one or more hyper-key links (exported foreign hyper-keys) that terminate by pointing to the virtual table attached to the conventional index.

The first step of process 600 in creating the hyper-index is to vary the path described in the previous paragraph. Once that has been done, a descriptor is created at step 601 that identifies the conventional index involved, as well as each step in the chain of hyper-key links from the initial foreign hyper-key to the final primary or secondary hyper-key exported by the virtual table attached to the conventional index.

The second step is to attach to the descriptor a list of Access Masks (step 603), a copy of the one for the virtual table it is attached to, a copy of the one for the virtual table providing the data for the index, and copies of the Access Masks for each of the virtual tables containing a foreign hyper-key used as a hyper-key link in the chain from the hyper-index to the conventional index.

Next, the index descriptor is added to the global Index Descriptor Array structure, and the table id of the parent virtual table, over which the hyper-index has been created, is added to the global Parent Table Array structure—both using the index id as the access point.

The final step in creating the hyper-index is to identify all the dependencies of the hyper-index. A Record Dependency Tree is created for identifying the dependency of individual sections of the hyper-index, which are identified by the record ids for records within the parent virtual table, to records existing in other virtual tables. The entries are entered and accessed by the table id and record id of the foreign record upon which the section is dependent. A Hyper-Index Dependency Map is created for each hyper-index. Within that map, a bit is assigned for each virtual table in the system. The map has all bits set to inactive except for the bit corresponding to the virtual table attached to the hyper-index, the bit corresponding to the virtual table attached to the conventional index, and the bits corresponding to each virtual table containing a foreign hyper-key used as a hyper-key link in the chain from the hyper-index to the conventional index.

Referring now to FIG. 7A, this figure shows the steps involved in retrieving an external id for a component that has been registered. Steps 701, 702, and 703 are carried out whereby step 701 creates a unique name by combining the table name with the field or index name. If during step 702, the name is found within the lookup structure, the external id retrieved in step 703 is returned. If during step 702, the name is not found within the lookup structure, an error code is returned at step 704*b*.

Figure 7:
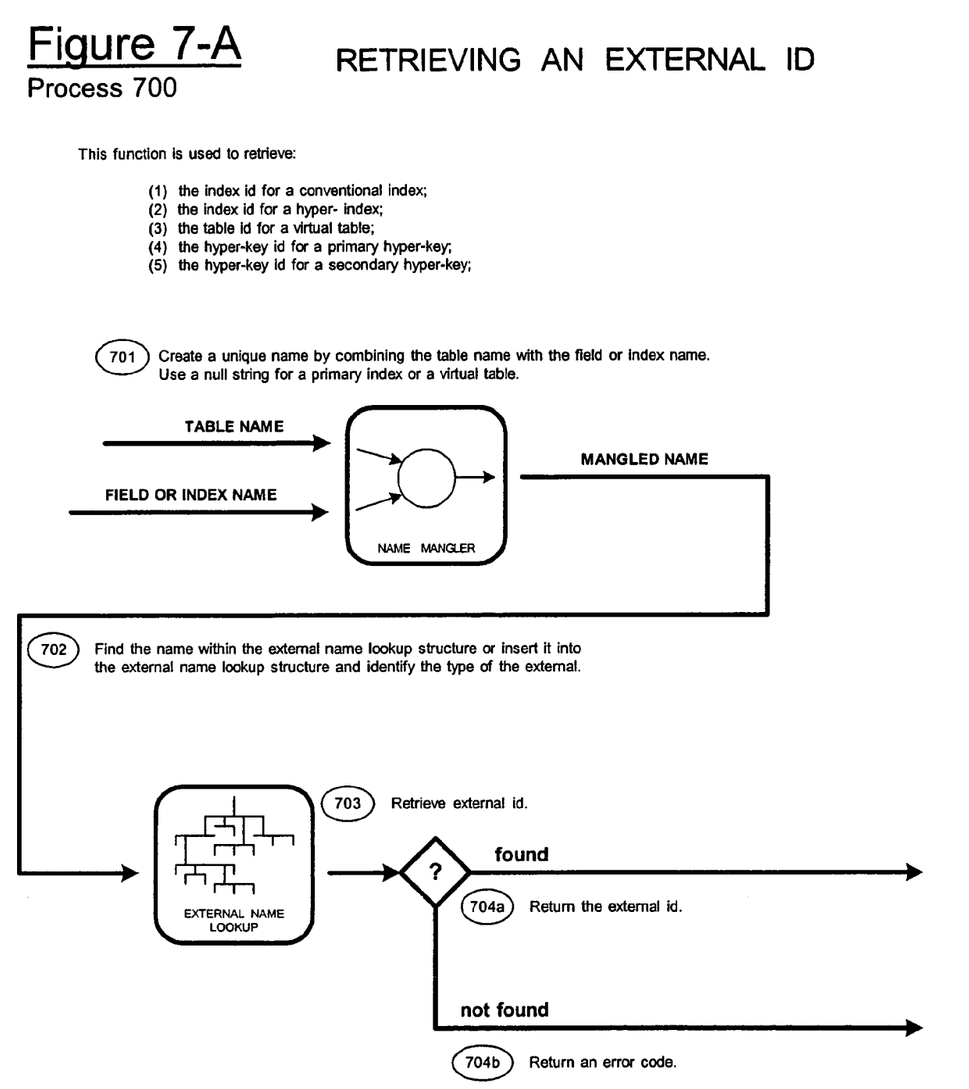
FIGS. 7A-7B are flow charts illustrating respectively the steps for retrieving an external ID for a component that has been registered and for creating a hyperlink path as part of a hyper-index descriptor.

In FIG. 7-B, the steps involved in creating a hyper-key link path 750 as part of a hyper-index descriptor are illustrated. For each hyper-key link in the source hyper-key link path, the link id is retrieved at step 751 using the table and field names where the hyper-key exists, and added to the resulting hyper-key link path at 752. The path is then terminated with a zero at step 753 and returned to the calling routine at 754.

Modifying Virtual Tables. A virtual table is modified in direct response to changes in the actual table within the member database. The changes can be to data the virtual table is caching or to data being indexed by a conventional index attached to the virtual table, or to local or foreign hyper-key values.

Any time a record is accessed in the update process, the primary hyper-key, or identity value, is automatically exported and dereferenced to retrieve the record id. If a record is inserted, the primary hyper-key is added to the lookup structure. If a record is deleted, the primary hyper-key is removed from the lookup structure. However, a deleted hyper-key may not be reused until the next time the virtual table is being updated.

If a new or updated record contains one or more fields with a foreign hyper-key, each foreign hyper-key is dereferenced using the hyper-key lookup structure for the specific hyper-key, and the resulting hyper-id stored in its place within the record. Next, if the foreign hyper-key is to be exported as a hyper-key link, the hyper-id from dereferencing the foreign hyper-key is stored in the lookup structure for the hyper-key link, accessed by the record id.

Finally, if one or more fields contain a secondary hyper-key for export, each secondary hyper-key is exported in the following way. (1) The hyper-key string is located within the lookup structure for the hyper-key, which returns the id of a list of record ids identifying records associated with the secondary hyper-key. (2) The record id for the record being modified is added to that list.

Each time a virtual table is modified, the appropriate bit is set in the Updated Virtual Table Map structure. Additionally, the record id of each record modified or deleted is added to the Modified Records List for that virtual table.

Updating Conventional Indexes. Each time a record is updated within a virtual table, any conventional indexes attached to that virtual table must be updated as well.

Each time a conventional index is modified due to changes in a record, the information from the index relating to that record must be exported. The actual information that is exported will depend on the type of index method being used. The important point is that whatever information is necessary for inserting the record into the actual index be exported. That information is added to the Exported Index Updates List for that index—a list of index update information that can be accessed directly by record id, and will be used in updating hyper-indexes based upon the conventional index.

Figure 8:
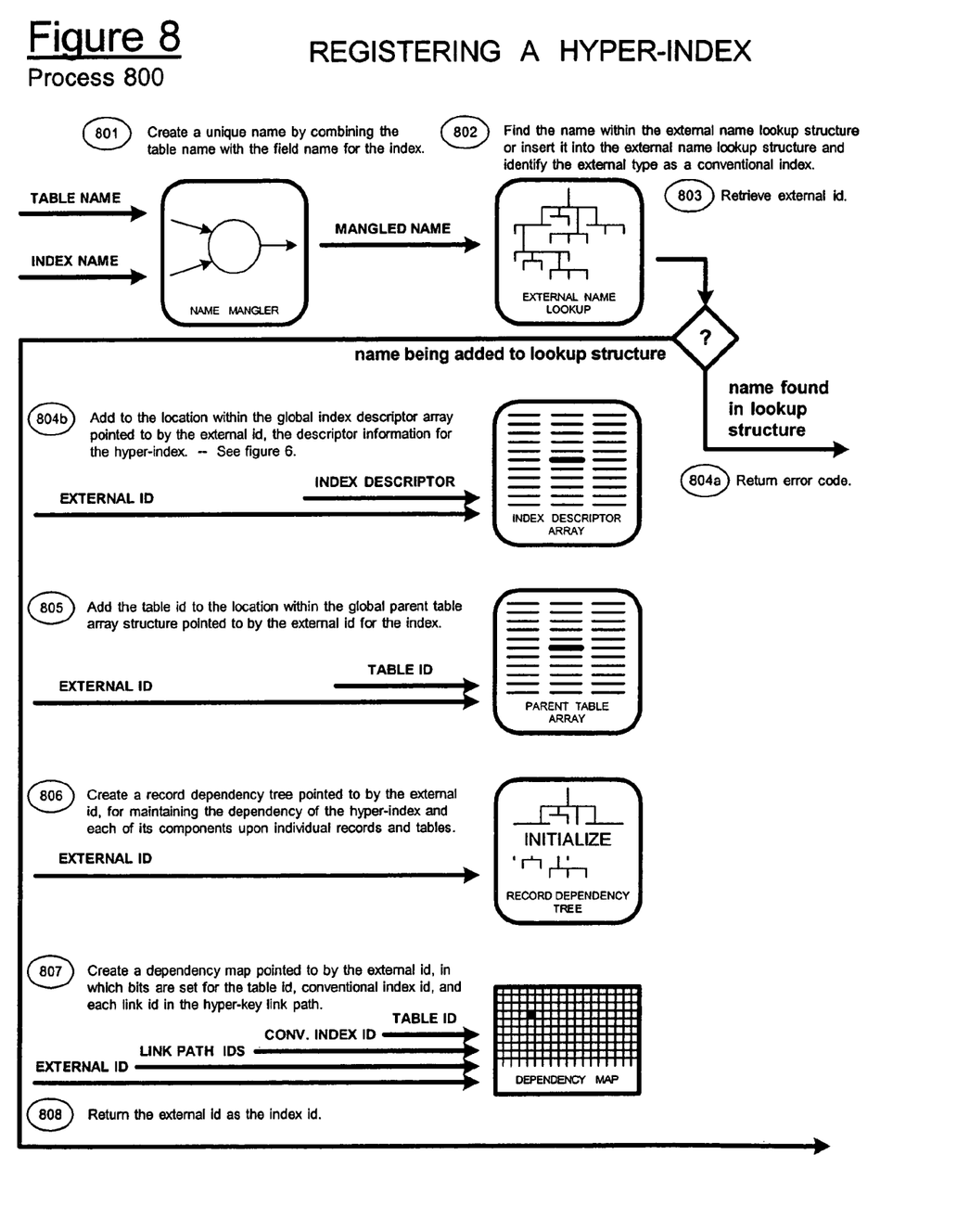
FIG. 8. Is a flow chart that illustrates the steps involved in registering a hyper-index.

FIG. 8 shows the steps involved in registering a hyper-index 800. Steps 801, 802, and 803 are carried out as follows: at step 801 a unique name is created by combining the table name with the field name for the index. If during step 802, the name is found within the lookup structure, the index is being doubly defined and an error is returned at step 804a. Otherwise, steps 804b, and 805 through 808 are carried out as described in the Figure and the external id retrieved in step 803 is returned as the index id.

Figure 9:
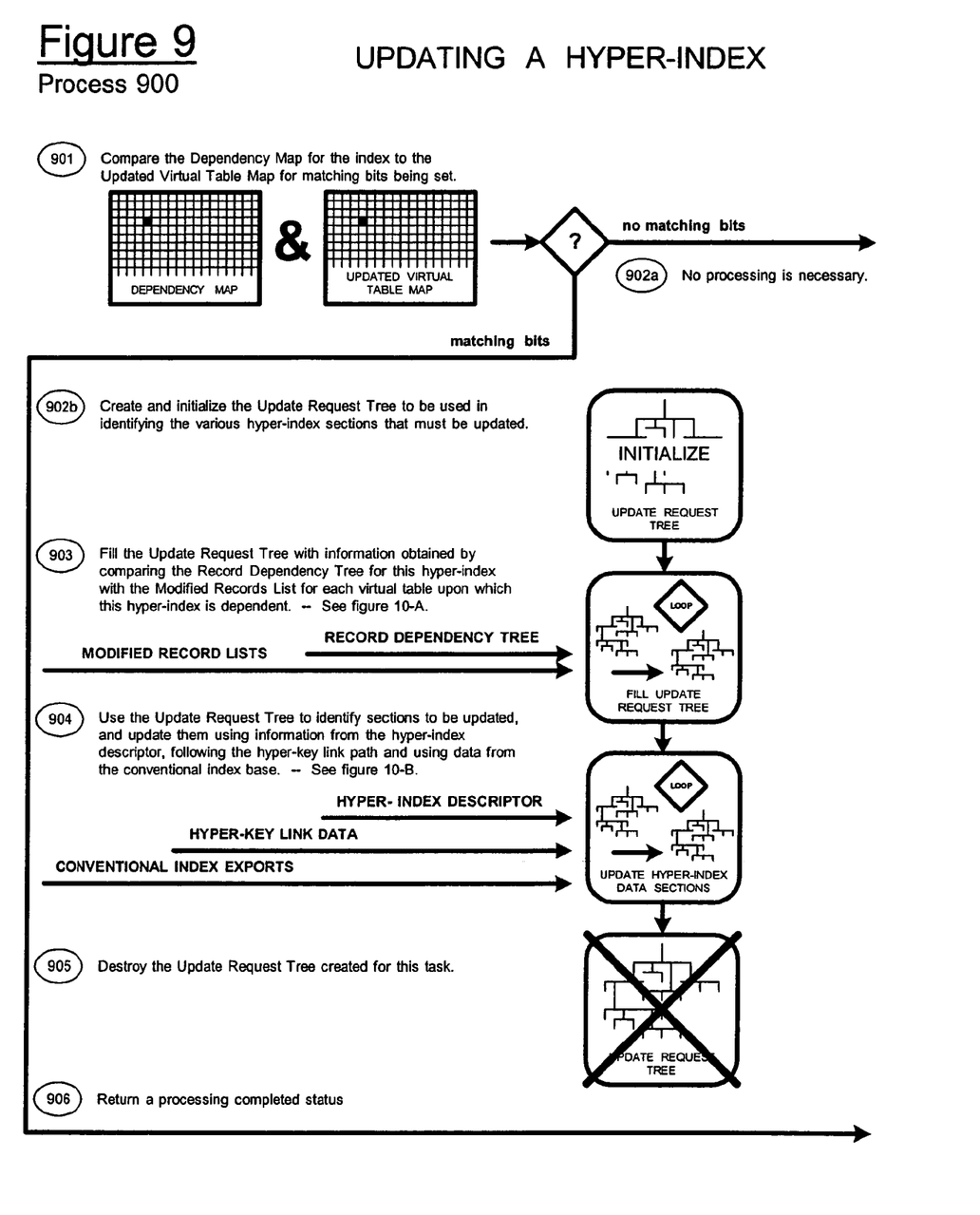
FIG. 9. is a flow chart that shows the steps involved in updating a hyper-index.

Updating Hyper-Indexes. As shown in FIG. 9, once all virtual tables and conventional indexes have been modified, it is time to update the hyper-indexes through process 900. Whether or not an individual hyper-index needs to be updated is determined by comparing the Hyper-Index Dependency Map for the hyper-index with the Updated Virtual Table Map at step 902. If it occurs at least once that a bit set in the Hyper-Index Dependency Map is also set in the Updated Virtual Table Map, the hyper-index must be processed at 902a.

Determining which record entries must be updated within the hyper-index is more complicated. This requires the use of the Record Dependency Tree for the hyper-index, and the Modified Records List for each virtual table for which bits were set in both the Hyper-Index Dependency Map and the Updated Virtual Table Map tested in the preceding paragraph. The record ids for the record entries that must be updated within the hyper-index are stored a structure known as the Update Request Tree. A new Update Request tree is created each time a hyper-index is to be updated and deleted after the update is completed. The Record Dependency Tree is a lookup structure that stores a list of local record ids for sections of the hyper-index that are dependent on a specific record within some other virtual table. The list is stored and accessed by a combination of remote virtual table id and remote record id.

Figure 10:
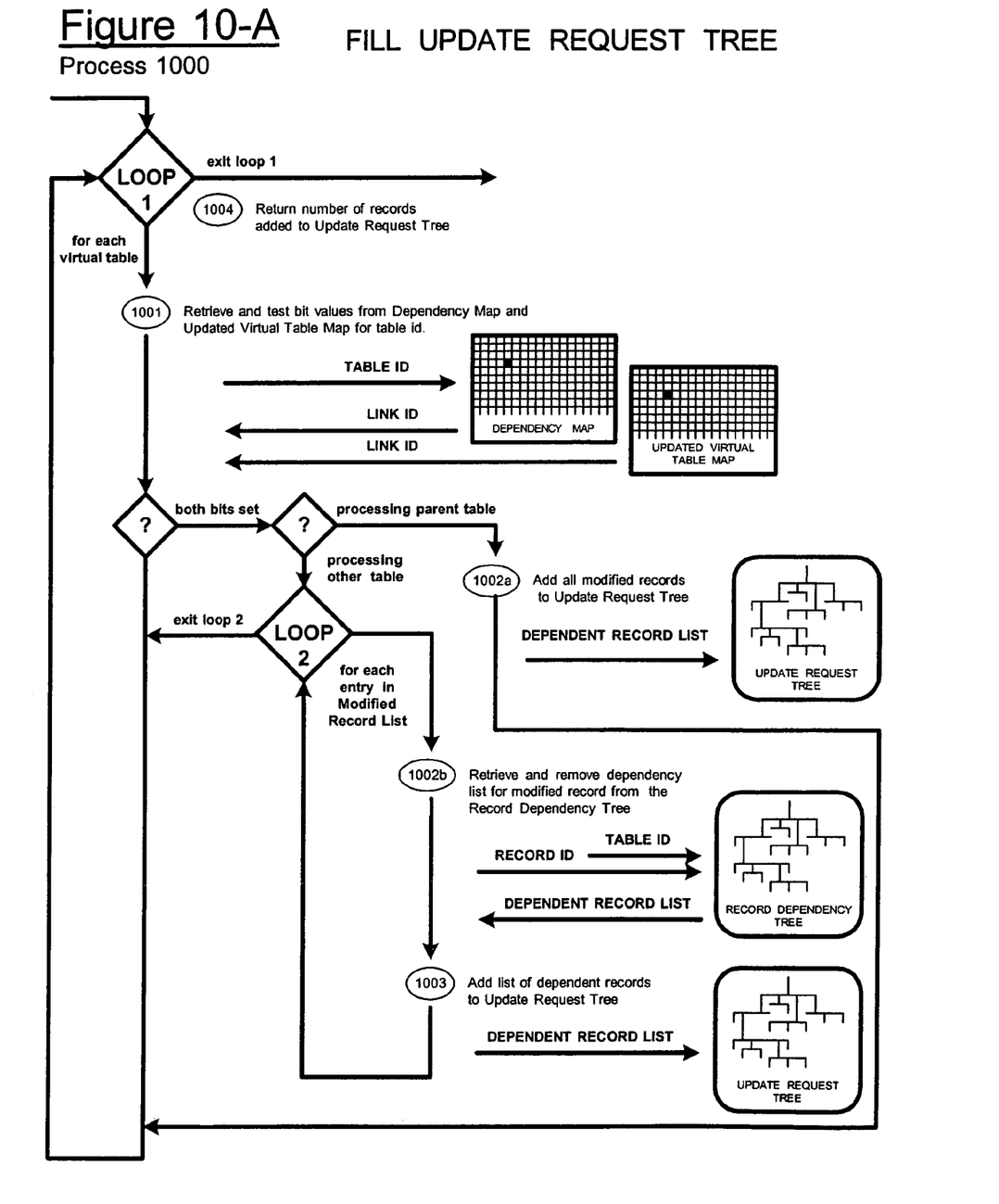

The process of filling the Update Request Tree is shown through the following steps: (1) All record ids from the Modified Records List for the virtual table attached to the hyper-index are loaded into the Update Request Tree at step 1002a. (2) Each record id in the Modified Records List for each of the modified virtual tables upon which the hyper-index is dependent is used to locate a possible list of record ids within the Record Dependency Tree at step 1002b. (3) If a match is found, all record ids in the list found are added to the Update Request Tree and the matching entry is removed from the Record Dependency Tree at step 1003.

Once the Update Request Tree has been properly filled, the hyper-index data for each local record id found in the Update Request Tree is modified in the following way: (1) Any data in the hyper-index for that local record id is removed. (2) The hyper-key path is followed from virtual able to virtual table until the final virtual table in the path is encountered and the remote record ids for all the relevant sections of the conventional index associated with it and the hyper-index have been identified. If only primary hyper-keys were included in the path, only data for one remote record id would need to be imported. However, if one or more hyper-keys were secondary, data from multiple remote record ids may be required. (3) Remote record id by remote record id, the exported sections of the conventional index are extracted from the Exported Index Updates List for that index and inserted into the section of the hyper-index associated with the local record id.

In order to maintain this system, the Record Dependency Tree must be kept up to date. To that end, each time a remote record id is encountered while following the hyper-key path, including the record ids within the final virtual table, and all remote record ids associated with hyper-key links in the hyper-key path; the local record id for which the data is being imported is added to a list of local record ids pointed to by the remote virtual table id and the remote record id within the Record Dependency Tree.

Once all hyper-indexes have been processed, the Updated Virtual Table Map is reset to all zeros and the Modified Records List for each virtual table is cleared.

Searching Indexes. Searching any index, whether a conventional index or a hyper-index is carried out the same way. However, access to the index differs between the two index types. For a conventional index, the users Group Mask is compared against the Access Mask attached to the index. If it occurs at least once that a bit set in the Group Mask is also set in the Access Mask, then access to the index is granted. For a hyper-index, the user Group Mask is tested against each of the Access Masks attached to the hyper-index. For each Access Mask tested, If it occurs at least once that a bit set in the Group Mask is also set in the Access Mask then that Access Mask passes the test. If every Access Mask passes the test, access is granted. If even one Access Mask does not pass the test access is denied. If access is granted the search is carried out.

Retrieving Data. Retrieving data, either from cached fields within virtual tables or fields within tables mapped by virtual tables is the same as with a conventional virtual data warehouse after access has been granted to the virtual table, unless hyper-key retrieval is involved. If no hyper-key retrieval is involved, the users Group Mask is compared against the Access Mask attached to the virtual table. If it occurs at least once that a bit set in the Group Mask is also set in the Access Mask, then access to the virtual table and the cached data it holds and the actual table it maps is granted.

In a hyper-key retrieval, the user identifies a sequence of hyper-keys to follow from virtual table to virtual table until, in the end, he identifies the field or fields to extract from the cached data and/or the mapped database table. As with building a hyper index, if all the hyper-keys are primary, only data from one record will be returned. However, if one or more of the hyper-keys is secondary, data from multiple records could be returned. To gain access to the data the Group Mask must be tested against the Access Mask for each virtual table being accessed while following the hyper-keys. For each Access Mask tested, If it occurs at least once that a bit set in the Group Mask is also set in the Access Mask then that Access Mask passes the test. If every Access Mask passes the test, access is granted. If even one Access Mask does not pass the test access is denied. If access is granted the data retrieval is carried out.

The invention may be implemented as one or more computers (including network servers) operating according to computer program logic stored on a computer usable medium. The computer program logic is configured to be used by a computer to create and access the virtual data warehouse, as disclosed above. The virtual data warehouse and corresponding software may be server-based, with access available via UNIX/Solaris, Windows and Linux platforms. The virtual data warehouse may be accessed and searched via the world wide web. Using the server-based system, a user may request a search from and retrieved data may be returned to a user's desktop computer, laptop computer, or personal digital assistant ("PDA"). Search results returned to a user are displayed and sorted.

What is claimed as new and desired to be protected by Letters Patent of the United States is:

1. A computer implementing a virtual data warehouse stored on a computer-useable medium, comprising:
    a plurality of virtual tables, each including one or more records, each virtual table representative of a conventional table in a remote database and each record within the virtual tables corresponding to a record within the represented conventional table and containing an identity value for accessing the corresponding record;
    a plurality of hyper-keys, each able to be resolved from look-up values into direct virtual links to target records as soon as the look-up values are entered into the warehouse, each hyper-key being used for linking records in one of the plurality of virtual tables to one or more records in a specified other virtual table from the plurality of virtual tables;
    at least one virtual table with one or more records, each record containing one or more hyper-keys, each hyper-key used to access one or more records in one of the virtual tables from the plurality of virtual tables representing a conventional table in a remote database;
    at least one virtual table index that is a conventional index created from data extracted from the records within a conventional table in a remote database and used to access the corresponding records within the virtual table representing the conventional table; and
    at least one hyper-index, which is a conventional index, derived from data exported from a virtual table index and used to access records within a virtual table other than the virtual table associated with the virtual table index by replacing, within a list of record identity values or similar structure associated with an indexed record, the record identity values from a first virtual table with record identity values for the records within a second virtual table that are linked by hyper-keys to the records in the first virtual table.

2. The computer implementing the virtual data warehouse of claim 1, wherein the at least one hyper-index is derived from data represented in an index of the first virtual table.

3. The computer implementing the virtual data warehouse of claim 2, wherein the original structure of the first virtual table index is maintained.

4. The computer implementing the virtual data warehouse of claim 2, wherein the at least one hyper-index is automatically updated to reflect changes in the plurality of virtual tables linked via the plurality of hyper-keys.

5. The computer implementing the virtual data warehouse of claim 1, wherein each of the plurality of virtual tables includes an access mask that identifies one or more entities with access rights to the corresponding virtual table.

6. The computer implementing the virtual data warehouse of claim 5, wherein each of the plurality of virtual tables is accessed via a request that includes a group mask that lists one or more entities that match at least one of the one or more entities listed in the access mask of the corresponding virtual table.

7. The computer implementing the virtual data warehouse of claim 6, wherein the at least one hyper-index restricts access to the first and second virtual tables according to the access masks of the first and second virtual tables and intervening tables and the group masks of the requests.

8. The computer implementing the virtual data warehouse of claim 1, wherein the plurality of hyper-keys indirectly link the first and second virtual tables via additional virtual tables.

9. The computer implementing the virtual data warehouse of claim 1, wherein the plurality of hyper-keys directly link the first and second virtual tables.

10. The computer implementing the virtual data warehouse of claim 1, wherein the plurality of hyper-keys are automatically updated to reflect changes in the remote database tables corresponding to the plurality of virtual tables containing the plurality of hyper-keys.

11. The computer implementing the virtual data warehouse of claim 1, wherein the plurality of hyper-keys includes local hyper-keys for export to other virtual tables and foreign hyper-keys for linking to records in other virtual tables.

12. A computer program product, comprising: a computer-useable medium upon which computer program logic is recorded, the computer program logic configured to create and maintain a virtual data warehouse stored on said computer-useable medium, comprising:
    virtual tables, each representative of a conventional table in a remote database accessible by the computer upon which the virtual data warehouse is created, with each record within the virtual table corresponding to a record within the represented conventional table and containing an identity value for accessing the corresponding record;
    hyper-keys, which can be resolved from look-up values into direct virtual links to target records as the look-up values are entered into the warehouse, each hyper-key being used for linking records in one of the virtual tables to one or more records in a specified other virtual table;
    at least one virtual table with one or more records, each record containing one or more hyper-keys, each hyper-key used to access one or more records in a virtual table representing a conventional table in a remote database;
    a virtual table index that is a conventional index created from data extracted from the records within a conventional table in a remote database and used to access the corresponding records within the virtual table representing that conventional table; and
    a hyper-index, which is a conventional index, derived from data exported from a virtual table index and used to access records within a virtual table other than the virtual table associated with the virtual table index by replacing, within a list of record identity values or similar structure associated with an indexed record, the record identity values from a first virtual table with record identity values for the records within a second virtual table that are linked by hyper-keys to the records in the first virtual table.

13. The computer program product of claim 12, wherein the hyper-index is derived from data represented in a first virtual table index.

14. The computer program product of claim 13, wherein an original structure of the first virtual table index is maintained.

15. The computer program product of claim 13, wherein the hyper-index is updated to reflect changes in the virtual tables linked via the hyper-keys.

16. The computer program product of claim 12, wherein the virtual tables each include an access mask that identifies one or more entities with access rights to the corresponding virtual table.

17. The computer program product of claim 16, wherein the virtual tables are accessed via a request that includes a group mask that lists one or more entities that match at least one of the one or more entities listed in the access mask of the corresponding virtual table.

18. The computer program product of claim 17, wherein the hyper-index restricts access to the virtual tables linked by the hyper-keys according to the access masks of the virtual tables and the group masks of the requests.

19. The computer program product of claim 12, wherein the hyper-keys are updated to reflect changes in the remote database tables corresponding to the virtual tables containing the hyper-keys.

20. The computer program product of claim 12, wherein the hyper-keys include local hyper-keys for export to other virtual tables and foreign hyper-keys for linking to records in other virtual tables.

21. A method for building a virtual data warehouse, the method comprising:
building virtual tables that each include one or more records, each virtual table representative of a conventional table in a remote database and each record within the virtual tables corresponding to a record within the represented conventional table and containing an identity value for accessing the corresponding record;
building virtual tables that each include one or more records, each record containing one or more hyper-keys, each hyper-key used to access one or more records in a virtual table representing a conventional table in a remote database;
linking records from different virtual tables via one or more hyper-keys which are resolved into virtual links for fast access;
building one or more virtual table indexes to allow indexing and searching of data represented in the records of a virtual table without requiring storage of or access to data in the corresponding conventional table, each virtual table index being derived from data extracted from records within the conventional table represented by the virtual table, the records having corresponding records within the virtual table; and
building at least one hyper-index to allow searching of data represented by records in various virtual tables linked to records in a single virtual table by the hyper-keys as though the data was actually within the records of the single virtual table, each hyper-index being derived from data exported from a virtual table index and used to access records within a virtual table other than the virtual table associated with the virtual table index by replacing, within the list of record identity values or similar structure associated with an indexed record, the record identity values from a first virtual table with record identity values for the records within a second virtual table that are linked by hyper-keys to the records in the first table.

22. The method of claim 21, further comprising automatically updating the hyper-keys when the remote database tables corresponding to the virtual tables containing the hyper-keys are changed.

23. The method of claim 22, further comprising automatically updating the at least one hyper-index when the hyper-keys are updated.

24. The method of claim 21, further comprising applying an access mask to each virtual table to restrict access to each table according to a list of one or more entities identified in the access mask.

25. The method of claim 24, further comprising updating the at least one hyper-index to reflect the access masks applied to each virtual table.

26. A method of searching a virtual data warehouse according to a user's search request in order to return and display data to the user via a computer in response to the search request, the method comprising:
using one or more virtual table indexes to retrieve records from a single virtual table, the single virtual table corresponding to a conventional table in a remote database where actual data is stored;
using one or more hyper-indexes to retrieve records from the virtual table, each hyper-index allowing the searching of data represented by records in various virtual tables linked to records in the single virtual table by hyper-keys as though the data was actually within the records of the single virtual table; and
using one or more hyper-keys to link records from one or more virtual tables, the one or more virtual tables corresponding to one or more conventional tables in remote databases where actual data is stored.

27. The method of claim 26, wherein two or more hyper-indexes used to retrieve records from the same virtual table provides support for simple parametric queries involving data represented in the corresponding virtual tables associated with the virtual table indexes from which the hyper-indexes were derived.

28. The method of claim 26, further comprising using a group mask in the search request to identify the groups requesting the search.

29. The method of claim 28, further comprising using an access mask for each of the one or more virtual tables linked by the hyper-keys, the access masks restricting access to the corresponding virtual tables to a list of entities identified by the access masks.

30. The method of claim 29, further comprising granting access to a virtual table for only the groups listed in the search request group mask that match the entities identified by the access mask of the virtual table being accessed.

* * * * *